(12) United States Patent
Grewal et al.

(10) Patent No.: US 7,690,025 B2
(45) Date of Patent: Mar. 30, 2010

(54) METHODS AND SYSTEMS FOR ACCESSING A NETWORK-BASED COMPUTER SYSTEM

(75) Inventors: Sukhminder S. Grewal, New Haven, CT (US); Ismail Pullwala, New Haven, CT (US); Tamas Simon, Stamford, CT (US)

(73) Assignee: General Electric Company, Schenectady, NY (US)

( * ) Notice: Subject to any disclaimer, the term of this patent is extended or adjusted under 35 U.S.C. 154(b) by 1035 days.

(21) Appl. No.: 10/406,646

(22) Filed: Apr. 3, 2003

(65) Prior Publication Data

US 2004/0199795 A1 Oct. 7, 2004

(51) Int. Cl.
G06F 7/04 (2006.01)
(52) U.S. Cl. .......................................... 726/8; 713/183
(58) Field of Classification Search ................. 713/183; 726/3, 5, 8
See application file for complete search history.

(56) References Cited

U.S. PATENT DOCUMENTS

| | | | |
|---|---|---|---|
| 5,944,824 A * | 8/1999 | He ................................. | 726/6 |
| 5,949,882 A | 9/1999 | Angelo | |
| 5,953,422 A | 9/1999 | Angelo et al. | |
| 5,960,084 A | 9/1999 | Angelo | |
| 6,067,625 A | 5/2000 | Ryu | |
| 6,133,912 A * | 10/2000 | Montero ...................... | 715/716 |
| 6,360,322 B1 | 3/2002 | Grawrock | |
| 6,370,649 B1 | 4/2002 | Angelo et al. | |
| 6,400,823 B1 | 6/2002 | Angelo | |
| 6,516,058 B1 * | 2/2003 | Yamada et al. .............. | 379/198 |
| 6,519,605 B1 * | 2/2003 | Gilgen et al. ........... | 707/103 R |
| 6,539,479 B1 | 3/2003 | Wu | |
| 6,715,082 B1 * | 3/2004 | Chang et al. .................... | 726/8 |
| 2003/0105981 A1 * | 6/2003 | Miller et al. ................. | 713/202 |
| 2004/0205176 A1 * | 10/2004 | Ting et al. .................... | 709/223 |

* cited by examiner

Primary Examiner—Benjamin E Lanier
(74) Attorney, Agent, or Firm—Armstrong Teasdale LLP

(57) ABSTRACT

A method for accessing a network-based computer system utilizing a server system that is coupled to a centralized database and at least one client system. The method includes the steps of entering at a client system a single sign on identification (SSO ID) and a single sign on password (SSO password) assigned to a user, receiving at the server system the user's SSO ID and SSO password, authenticating the SSO ID and SSO password by transmitting the SSO ID and SSO password to the database, displaying on the client system after authenticating the entered SSO ID and SSO password each computer system that the user is permissioned to access, selecting a computer system to be accessed by the user, randomly generating a user password at the server system for accessing the selected computer system, transmitting a user identification (user ID) and the randomly generated user password from the server system to the selected computer system; and accessing the selected computer system by the user.

25 Claims, 10 Drawing Sheets

METHODS AND SYSTEMS FOR ACCESSING A NETWORK-BASED COMPUTER SYSTEM

BACKGROUND OF THE INVENTION

This invention relates generally to computer network-based systems and more particularly to accessing network-based computer systems.

At least some known business entities utilize a variety of network-based computer systems as part of their normal operations of the business. Such computer systems are typically accessed by a variety of employees, and may include, for example, mainframe computer systems and independent legacy computer systems. Typically, an employee will access such a computer system by entering a user ID and a password into a computer workstation that is in communication with the computer system. The user ID and the password are processed by the computer system, and, if recognized by the computer system, the employee is granted access to the computer system.

Typically, each computer system will have its own format for establishing a user ID and a password. Such formats can be different for different computer systems. For example, one such system may only require a four digit user ID, while another such system may require up to seven characters for a user ID. Additionally, at least some computer systems only recognize numeric characters for a user ID) and/or for passwords, while other known systems may recognize both numeric and alphabetical characters.

Employees at business entities which have a variety of such computer systems, may be required to access more than one of these computer systems on a daily, weekly, or less frequently basis. Consequently, these employees are required to remember a specific user ID and password for each computer system. However, the user ID and password for one computer system may be significantly different from a user ID and password for another computer system, and may be in a format that is difficult to remember. If an employee is unable to remember a user ID and/or a corresponding password for accessing a computer system, the employee may be unable to access the computer system and may be unable to effectively perform his or her job functions.

BRIEF DESCRIPTION OF THE INVENTION

In one aspect, a method for accessing a network-based computer system using a server system is provided. The server system is coupled to a centralized database and at least one client system. The method includes the steps of entering at a client system a single sign on identification (SSO ID) and a single sign on password (SSO password) assigned to a user, receiving at the server system the user's SSO ID and SSO password, authenticating the SSO ID and SSO password by transmitting the SSO ID and SSO password to the database, displaying on the client system after authenticating the entered SSO ID and SSO password each computer system that the user is permissioned to access, selecting a computer system to be accessed by the user, randomly generating a user password at the server system for accessing the selected computer system, transmitting a user identification (user ID) and the randomly generated user password from the server system to the selected computer system, and accessing the selected computer system by the user.

In another aspect, a system for accessing a network based computer system is provided. The system includes a client system having a browser, a centralized database for storing information, and a server system. The server system is configured to be coupled to the client system and the database. The server system is further configured to receive from the client system a single sign on identification (SSO ID) and a single sign on password (SSO password) assigned to a user, transmit the SSO ID and SSO password to the database for authentication purposes, display on the client system each computer system that the user is permissioned to access based on the authenticated SSO ID and SSO password, prompt the user to select a computer system to be accessed, randomly generate a user password for accessing the selected computer system, transmit a user identification (user ID) and the randomly generated user password to the selected computer system, and access the selected computer system by the user.

In another aspect, a computer program embodied on a computer readable medium for accessing a network-based computer system is provided. The program includes a code segment that receives a single sign on identification (SSO ID) and a single sign on password (SSO password) assigned to a user and then authenticates the SSO ID and SSO password, displays on the client system each computer system that the user is permissioned to access, prompts the user to select a computer system to be accessed, randomly generates a user password for accessing the selected computer system, and transmits a user identification (user ID) and the randomly generated user password to the selected computer system such that the selected computer system is accessed by the user.

DETAILED DESCRIPTION OF THE INVENTION

Figure 1:
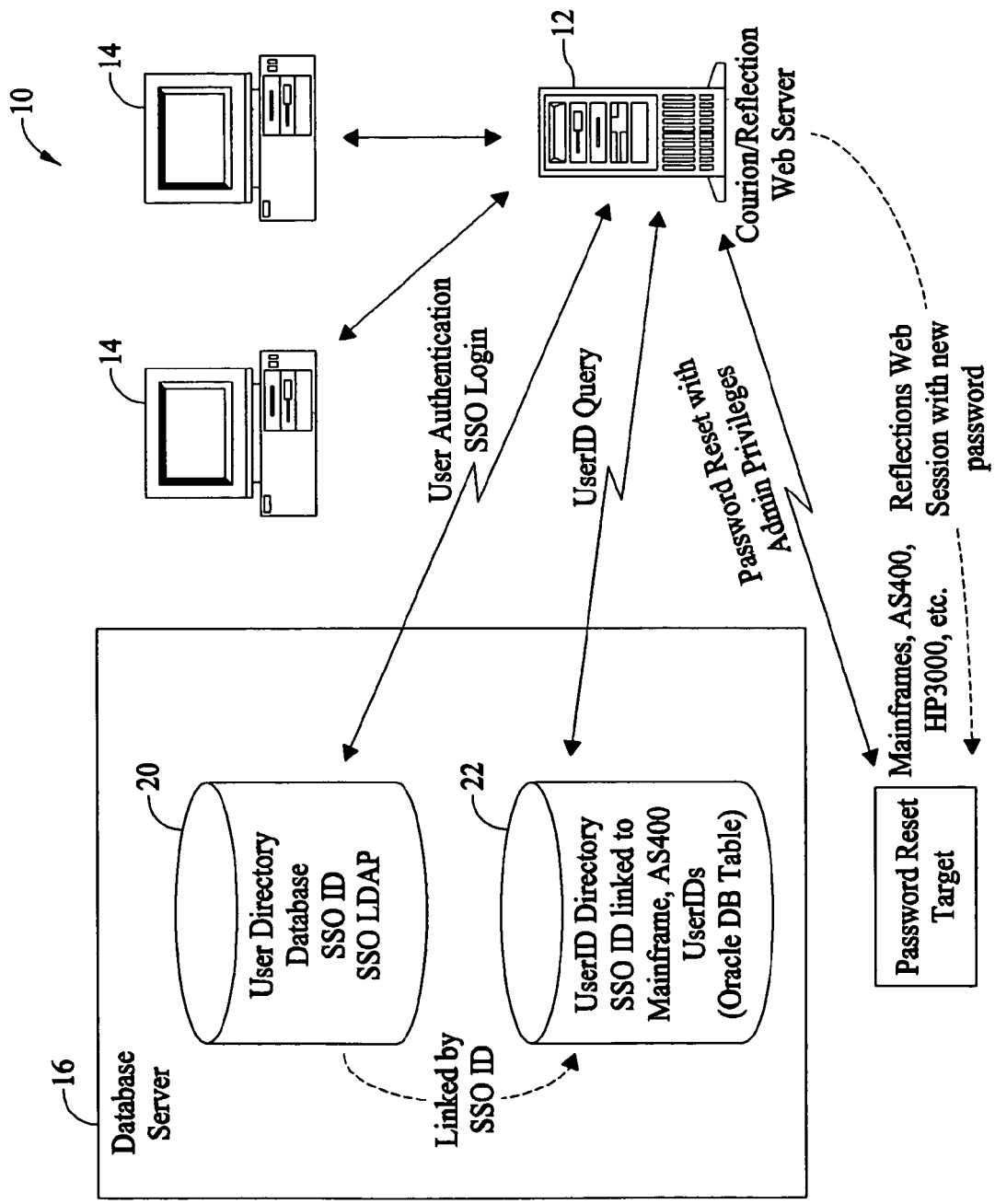
FIG. 1 is a simplified block diagram of a Single Sign On System (SSOS) in accordance with one embodiment of the present invention.

Methods and systems for accessing network-based computer systems are described herein in the context of utilizing a single sign on (SSO) page to access at least one computer system, also known as a mainframe and/or legacy computer system. The methods and systems, however, are not limited to accessing network-based computer systems and can be utilized for accessing other computer systems. For example, the methods and systems described herein can be utilized for accessing a stand alone computer that is not configured in a network. Although the methods and systems are believed to be particularly useful in accessing network-based computer systems, namely mainframe computer systems and independent legacy computer systems, that may be accessible via wide area networks and local area networks (e.g., an entity's intranet and the Internet), such systems and methods can be also used in accessing many other types of computer systems.

The methods and systems for accessing a computer system are described herein as being implemented in connection with a web site that is accessible via a computer network system, including an entity's intranet. The example web site provides a single entry point through which individuals can access a variety of computer systems in order to access information, support, training, and action. The web site also provides an integrated approach to providing internal users or customers with education, information and computer assisted or human help on a specific subject, problem or a project. In an alternative embodiment, the methods and systems for accessing a computer system as described herein may be implemented using a web site that is accessible via the Internet.

At least one technical effect produced by the system, which is referred to herein as a Single Sign On System ("SSOS"), includes enabling a user to launch a link in a browser on the user's workstation, which opens up a Single Sign On enabled web page. The user then logs into the SSO web page to gain access. The page that loads after the SSO login is a page interfacing with a password application that utilizes a SSO ID as an input parameter for generating a password reset workflow. In the example embodiment, the password application utilized by the system is known as PasswordCourier®, which is manufactured by Courion® Corporation, Natick, Mass. (PasswordCourier and Courion are both registered trademarks of Courion Corporation, Natick, Mass.) In the example embodiment, the SSO ID is the user's employee ID. In an alternative embodiment, the SSO ID is another form of identification for a user.

More specifically, in the example embodiment, the user logs into the SSO web page to gain access to a legacy computer system by entering a SSO ID and a password assigned to the user. The SSOS passes the user's SSO ID to a web page for validating the SSO ID. The SSOS validates the SSO ID by using a backend database to determine whether the entered SSO ID exists. Based on the SSO ID entered, a password application, known as PasswordCourier®, runs a query to return all user IDs associated with the given SSO ID. Each user ID returned from the backend database is associated with a legacy computer system. This information is also part of the record in the backend database. The user can then select which computer system the user wants to log into from a dropdown box. The system then generates a random password according to the password rules defined for the selected computer system. The password is captured in a variable and is passed to the password application. The password application then executes the password reset on the target computer system for the user ID selected. The randomly generated password, which is unknown to the user, is now the user's new password for the selected target computer system only.

A user session to the selected legacy computer system is then opened from the user's browser. In the example embodiment, the user session to the legacy computer system is opened from the browser using an Application Programming Interface (API) and a Telnet emulator, for example a WRQ Reflections® Web Emulator (WRQ Reflections is a register trademark of WRQ, Inc., Seattle, Wash.; and WRQ Reflections Web Emulator is manufactured by WRQ, Inc., Seattle, Wash.). API code communicates the user's user ID for the selected legacy computer system and the new randomly generated password to the legacy computer system. The user is then securely logged into the selected legacy computer system without ever typing, or knowing, the user's computer system password. Moreover, in the example embodiment, the system may also utilize a live "cookie" such that the user will not even need to enter the assigned SSO password.

The methods and systems described herein provide increased security for accessing computer systems, improve a user's convenience for accessing such computer systems because users only have to remember one set of IDs and passwords, and provide a seamless login to a variety of legacy computer systems.

In one embodiment, the system is a computer program embodied on a computer readable medium implemented utilizing Java® and Structured Query Language (SQL) with a client user interface front-end for administration and a web interface for standard user input and reports. (Java is a registered trademark of Sun Microsystems, Inc., Palo Alto, Calif.). In an example embodiment, the system is web enabled and is run on a business-entity's intranet. In yet another embodiment, the system is fully accessed by individuals having an authorized access outside the firewall of the business-entity through the Internet. In a further example embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process can be used in combination with other components and processes.

FIG. 1 is a simplified block diagram of a Single Sign On System (SSOS) 10 that includes a SSO server system 12, and a plurality of client sub-systems, also referred to as client systems 14, connected to SSO server system 12. In one embodiment, client systems 14 are computers including a web browser, such that SSO server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. In the example embodiment, SSO server system 12 is a Courion®/WRQ Reflections® Web Server. (Courion is a registered trademark of Courion Corporation, Natick, Mass.; and WRQ Reflections is a register trademark of WRQ, Inc., Seattle, Wash.)

SSOS 10 also includes a database server 16. Database server 16 is connected to a User Directory database 20 and a User ID Directory database 22. User Directory database 20 and User ID Directory database 22 are linked through a SSO ID. In the example embodiment, to gain access to a legacy computer system, a user logs into a SSO web page by entering into client system 14 an assigned SSO ID and password. SSO server system 12 transmits the user's SSO ID to User Directory database 20 for validating the SSO ID. SSOS 10 utilizes a Lightweight Data Access Protocol (LDAP) to validate the SSO ID at database 20.

After validation, SSO server system 12 generates a user ID query based on the SSO ID, which is transmitted to User ID Directory database 22. In the example embodiment, User ID Directory database 22 includes information relating to: (i) each user having permission to access a legacy computer system, (ii) each legacy computer system (e.g., mainframe, AS400, HP3000) that each user has been granted access to, and (iii) a user ID assigned to each user for each of the legacy computer systems.

In the example embodiment, each user ID returned from database 22 is associated with a legacy computer system. Each user ID is displayed in a table that includes a SSO ID column, a user ID column, and a System column.

SSOS 10 then enables a user to select which computer system the user wants to log into from a table transmitted from database 22. After the user selects the legacy computer system to access, SSO server system 12 generates a random password according to the password rules defined for the selected computer system. The password is captured in a variable and is passed to a password application. The password application then executes the password reset on the target computer system for the user ID selected. The randomly generated password, which is unknown to the user, is now the user's new password for the selected target computer system only. A user session to the legacy system is then opened from the browser on client system 14.

In another embodiment, User Directory database 20 and User ID Directory database 22 are stored on SSO server system 12 and can be accessed by potential users at one of client systems 14 by logging onto SSO server system 12 through one of client systems 14. In another embodiment, User Directory database 20 and User ID Directory database 22 are stored remotely from SSO server system 12 and may be non-centralized.

Figure 2:
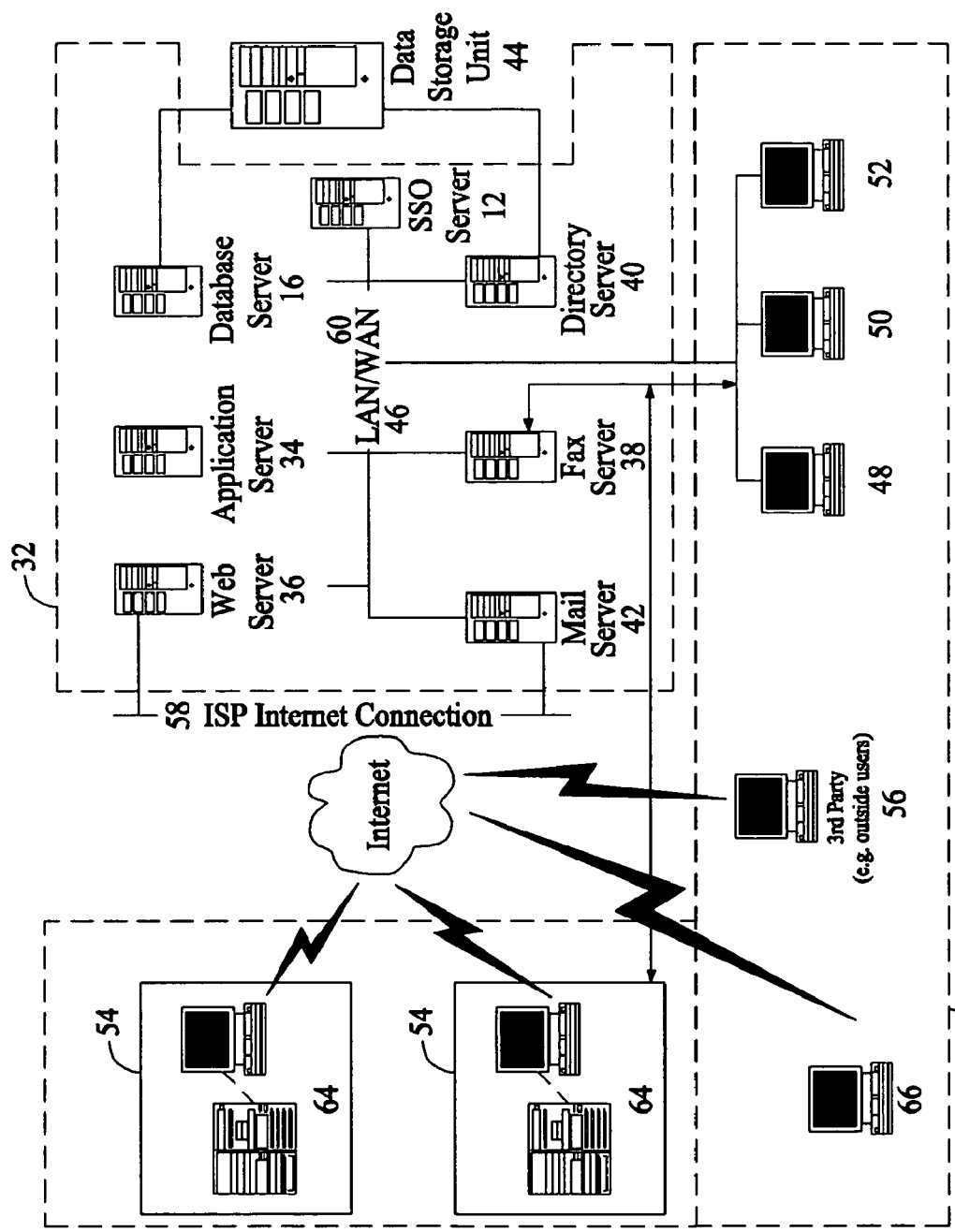
FIG. 2 is an expanded version block diagram of an example embodiment of a server system architecture of the SSOS.

FIG. 2 is an expanded version block diagram of an example embodiment of a server architecture of a SSOS 30. Components in system 30, identical to components of system 10 (shown in FIG. 1), are identified in FIG. 2 using the same reference numerals as used in FIG. 1. System 30 includes a server system 32, and client systems 14. Server system 32 further includes database server 16, an application server 34, a web server 36, a fax server 38, a directory server 40, a mail server 42, and SSO server 12. A data storage unit 44 is coupled to database server 16 and directory server 40. Data storage unit 44 includes User Directory database 20 and User ID Directory database 22 (shown in FIG. 1).

Servers 12, 16, 34, 36, 38, 40, and 42 are coupled in a local area network (LAN) 46. In addition, a system administrator's workstation 48, a user workstation 50, and a supervisor's workstation 52 are coupled to LAN 46. Alternatively, workstations 48, 50, and 52 are coupled to LAN 46 via an Internet link or are connected through an Intranet.

Each workstation, 48, 50, and 52 is a personal computer having a web browser. Although the functions performed at the workstations typically are illustrated as being performed at respective workstations 48, 50, and 52, such functions can be performed at one of many personal computers coupled to LAN 46. Workstations 48, 50, and 52 are illustrated as being associated with separate functions only to facilitate an understanding of the different types of functions that can be performed by individuals having access to LAN 46.

Server system 32 is configured to be communicatively coupled to various individuals, including employees 54 and to third parties, e.g., designated outside users, 56 via an ISP Internet connection 58. The communication in the example embodiment is illustrated as being performed via the Internet, however, any other wide area network (WAN) type communication can be utilized in other embodiments, i.e., the systems and processes are not limited to being practiced via the Internet. In addition, and rather than WAN 60, local area network 46 could be used in place of WAN 60.

In the example embodiment, any authorized individual having a workstation 64 can access SSOS 30. At least one of the client systems includes a manager workstation 66 located at a remote location. Workstations 64 and 66 are personal computers having a web browser. Also, workstations 64 and 66 are configured to communicate with server system 32. Furthermore, fax server 38 communicates with remotely located client systems, including a client system 66 via a telephone link. Fax server 38 is configured to communicate with other client systems 48, 50, and 52 as well.

Figure 3:
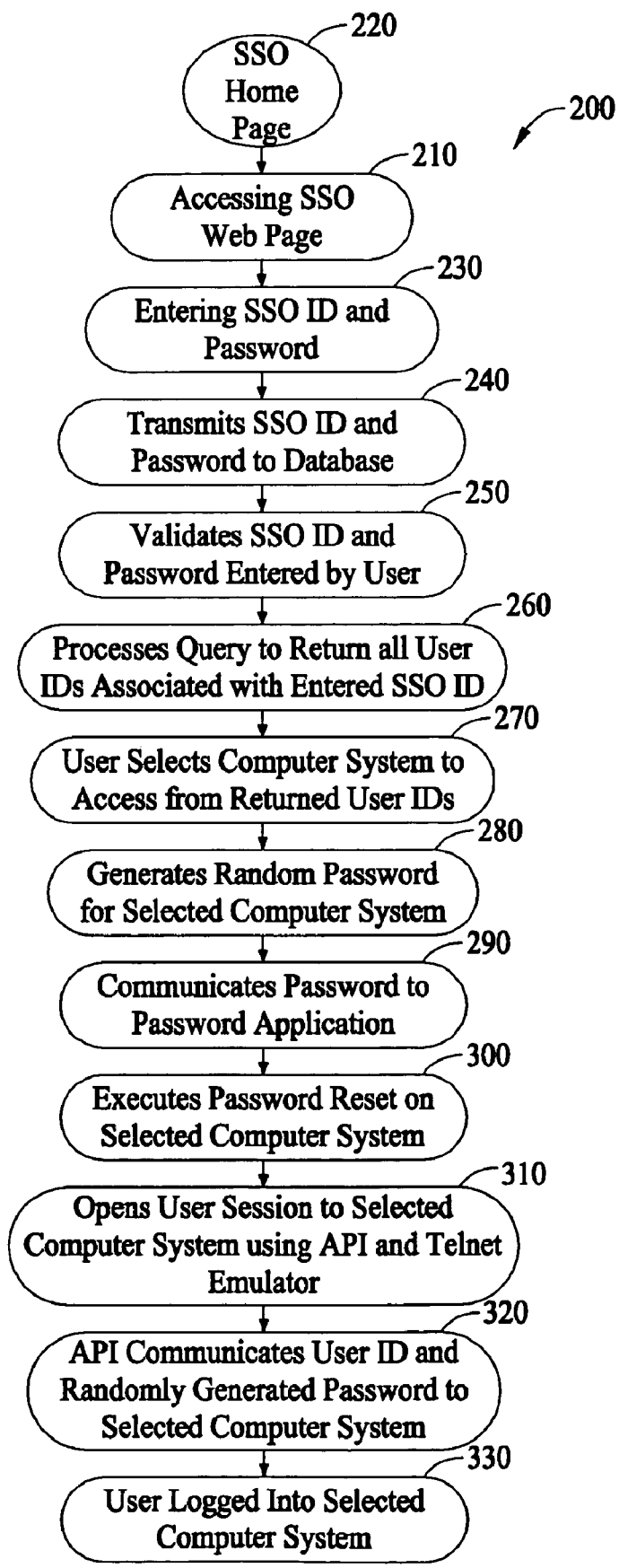
FIG. 3 is an example flowchart illustrating an example process employed by SSOS.

FIG. 3 is a flowchart 200 illustrating an example process employed by system 10 (shown in FIG. 1). A technical effect of SSOS 10 is achieved by a user first accessing 210 a user interface, such as a Single Sign On web page 220, through client system 14 (shown in FIG. 1) to gain access to a legacy computer system. The user then logs into SSOS 10 by entering 230 a SSO ID and a password assigned to the user through client system 14. SSO server system 12 (shown in FIG. 1) transmits 240 the inputted SSO ID and password for the user to a web page for validating the SSO ID. SSOS 10 validates 250 the SSO ID by using a backend database to determine whether the entered SSO ID exists. Based on the SSO ID entered, a password application, known as PasswordCourier®, processes 260 a query to return all user IDs associated with the given SSO ID. Each user ID returned from the backend database is associated with a legacy computer system.

The user then selects 270 which computer system the user wants to log into from a dropdown box generated by SSOS 10. After the user selects 270 the legacy computer system to access, SSO server system 12 generates 280 a random password according to the password rules defined for the selected computer system. The password is captured in a variable and the system communicates 290 the password to the password application. The password application then executes 300 the password reset on the selected computer system for the user ID selected. The randomly generated password, which is unknown to the user, is now the user's new password for the selected computer system only.

SSOS 10 opens 310 a user session to the legacy system from the browser on client system 14. In the example embodiment, SSOS 10 opens 310 the user session to the legacy computer system using an Application Programming Interface (API) and a Telnet emulator, for example a WRQ Reflections® Web Emulator. The API code communicates 320 the user ID of the user on the selected legacy computer and the new randomly generated password to the selected computer system. The user is then securely logged into 330 the selected legacy computer system without ever typing, or knowing, the user's computer system password.

Figure 4:
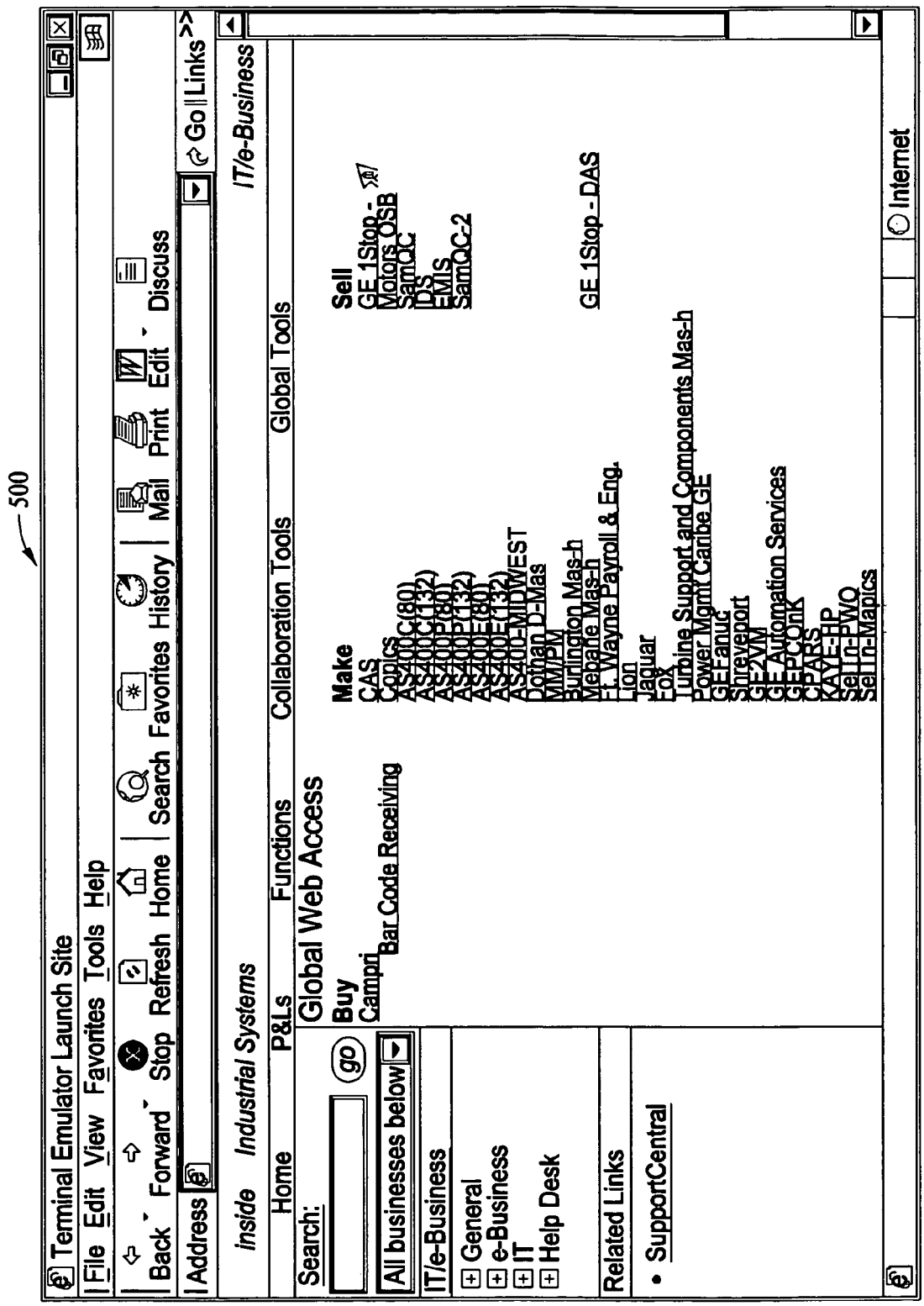
FIG. 4 is an example embodiment of a user interface included within a SSOS that displays a global web access home page.

FIG. 4 is an example embodiment of a user interface 500 displaying a global web access home page included within SSOS 10 (shown in FIG. 1) that includes a plurality of computer systems. In the example embodiment, the plurality of computer systems displayed on user interface 500 include mainframe computer systems and legacy computer systems. Each of the plurality of computer systems is displayed as a link on user interface 500. If a user wishes to access a specific computer system displayed on user interface 500, the user clicks on the link assigned to the specific computer system. In other embodiments, each computer system may be displayed on user interface 500 with a check box, a pull-down field, or other means of data entry.

Figure 5:
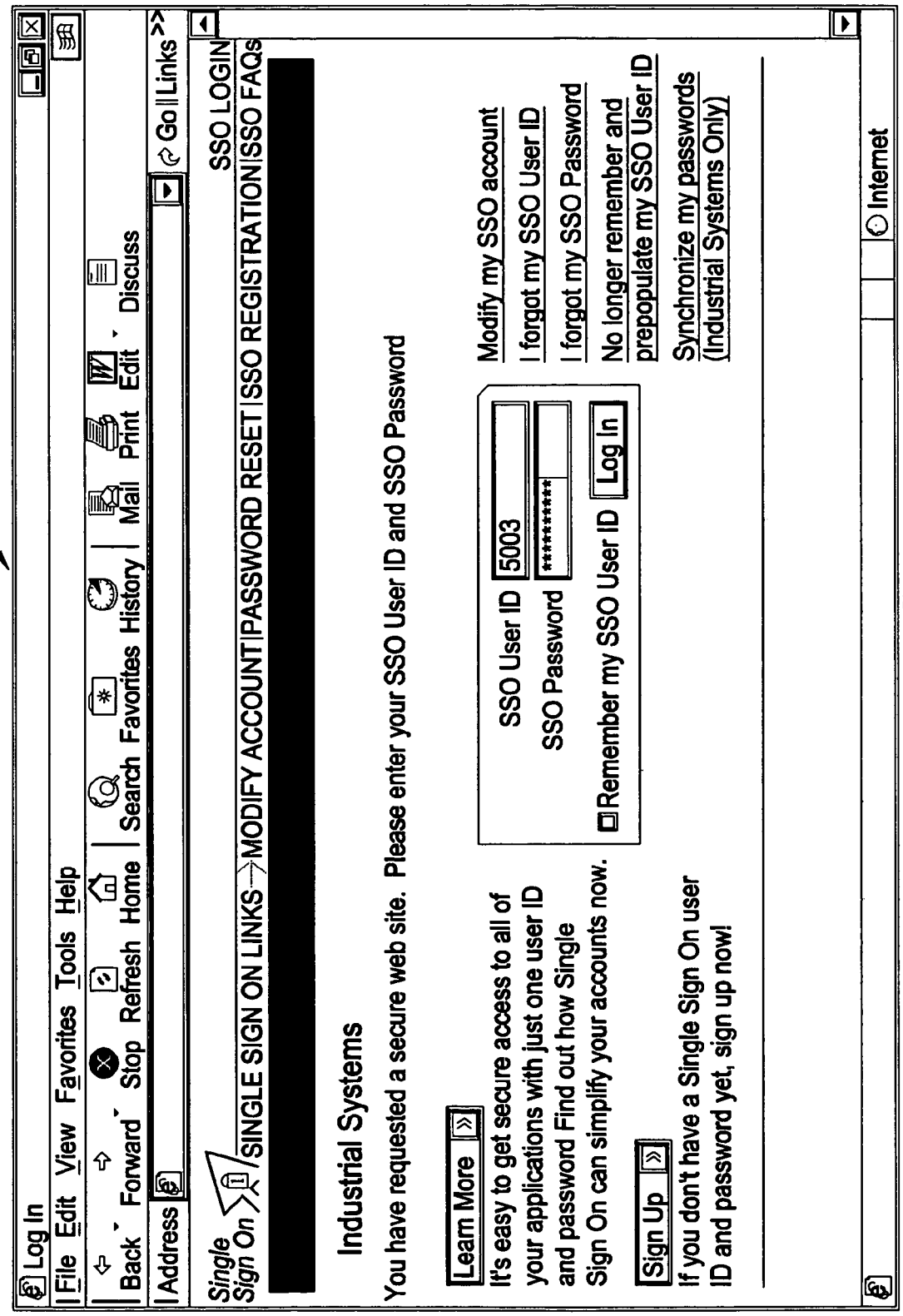
FIG. 5 is an example embodiment of a user interface included within a SSOS that displays a single sign on log in page.

FIG. 5 is an example embodiment of a user interface 550 displaying a single sign on log in page included within SSOS 10 (shown in FIG. 1). User interface 550 includes a Single Sign On (SSO) User ID data field, a Single Sign On Password data field, and a Log In button. User interface 550 also includes a SSO Registration link, a Modify Account link, a Password Reset link, a SSO Frequently Asked Questions (FAQ) link, a I Forgot My SSO User ID link, and a I Forgot My Password link. Although buttons and data fields are shown in the example embodiment, pull-down lists, check boxes and other means for inputting this information could also be used.

In the example embodiment, user interface 550 is displayed after a user selects a computer system link displayed on user interface 500 (shown in FIG. 4) and if the user is not already logged into SSOS 10 (shown in FIG. 1). The user then enters a SSO User ID assigned to the user into the SSO User ID data field, enters a SSO Password assigned to the user into the SSO Password data field, and clicks on the Log In button to access the selected computer system.

In the example embodiment, by selecting the Modify Account link, a user can access that particular user's account and modify the information assigned to that account. By selecting I Forgot My SSO User ID and Password links, a screen is displayed prompting the user to input certain information. By inputting the requested information, SSOS 10 provides the user with their assigned SSO ID and SSO Password.

Figure 6:
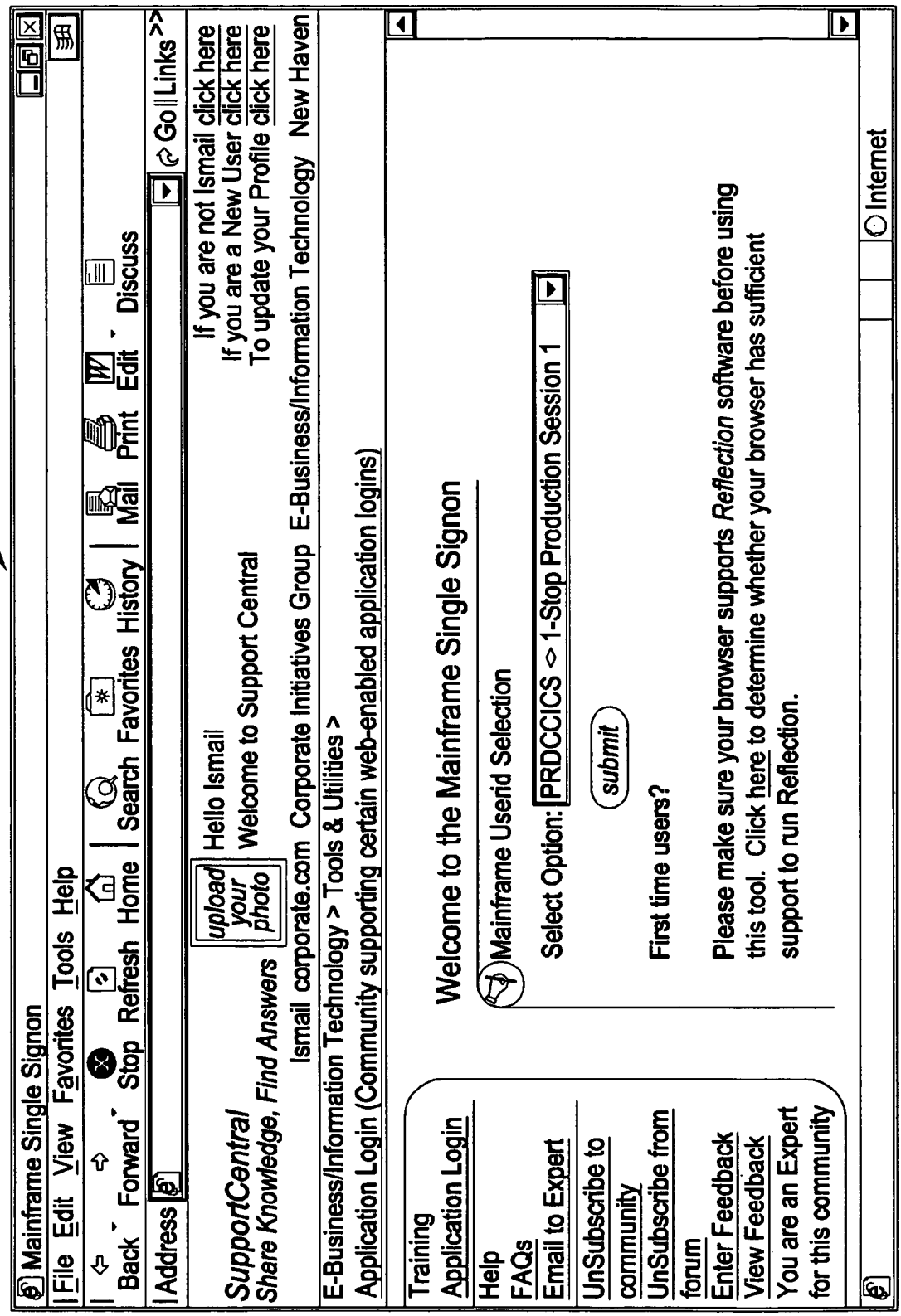
FIG. 6 is an example embodiment of a user interface included within a SSOS that displays a welcome to a mainframe single sign on page.

FIG. 6 is an example embodiment of a user interface 600 displaying a welcome to a mainframe single sign on page included within SSOS 10 (shown in FIG. 1). User interface 600 includes a Select Option pull-down field, and a Submit button. In the example embodiment, user interface 600 enables a user to select a specific mainframe application for the selected mainframe computer system. For example, as shown in user interface 600, a user has selected a "1-Stop" mainframe computer system and a "PRDCCICS" application operated by the 1-Stop mainframe computer system.

Figure 7:
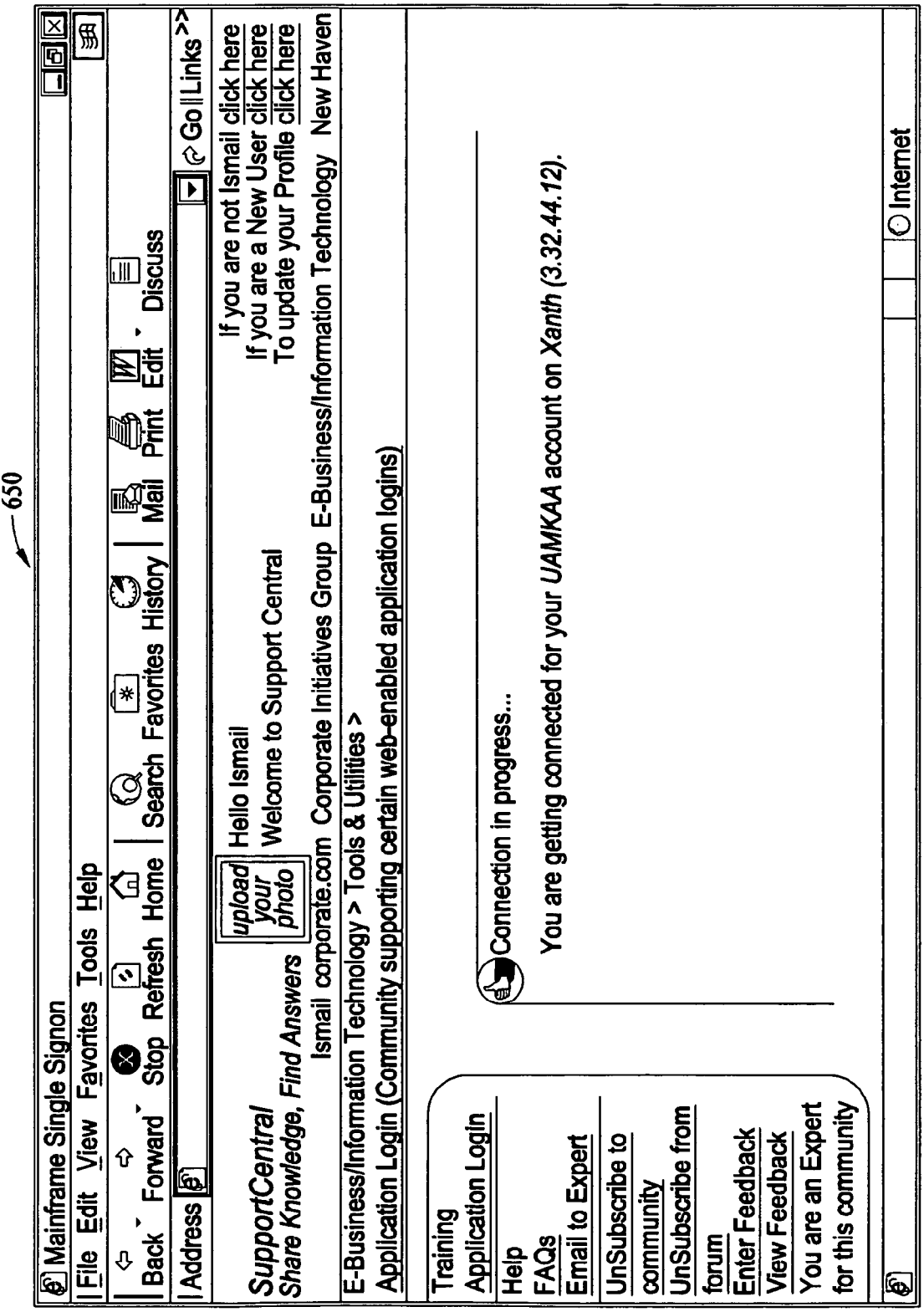
FIG. 7 is an example embodiment of a user interface included within a SSOS that displays a connection in progress page.

FIG. 7 is an example embodiment of a user interface 650 displaying a connection in progress page included with SSOS 10 (shown in FIG. 1). User interface 650 is displayed after the user has selected the computer system to access. User interface 650 is displayed while SSOS 10. (shown in FIG. 1) generates a random password according to the password rules defined for the selected computer system, which is then captured in a variable and is communicated to a password application. The password application then executes the password reset on the target computer system for the user ID selected. The randomly generated password, which is unknown to the user, is now the user's new password for the selected target computer system only.

SSOS 10 the opens a user session to the selected computer system from a browser on client system 14 (shown in FIG. 1). In the example embodiment, SSOS 10 opens the user session to the selected computer system using an Application Programming Interface (API) and a Telnet emulator, for example a WRQ Reflections® Web Emulator. The API code communicates the user ID of the user on the selected computer system and the new randomly generated password to the computer system. The user is then securely logged into the selected computer system without ever typing, or knowing, the user's computer system password.

Figure 8:
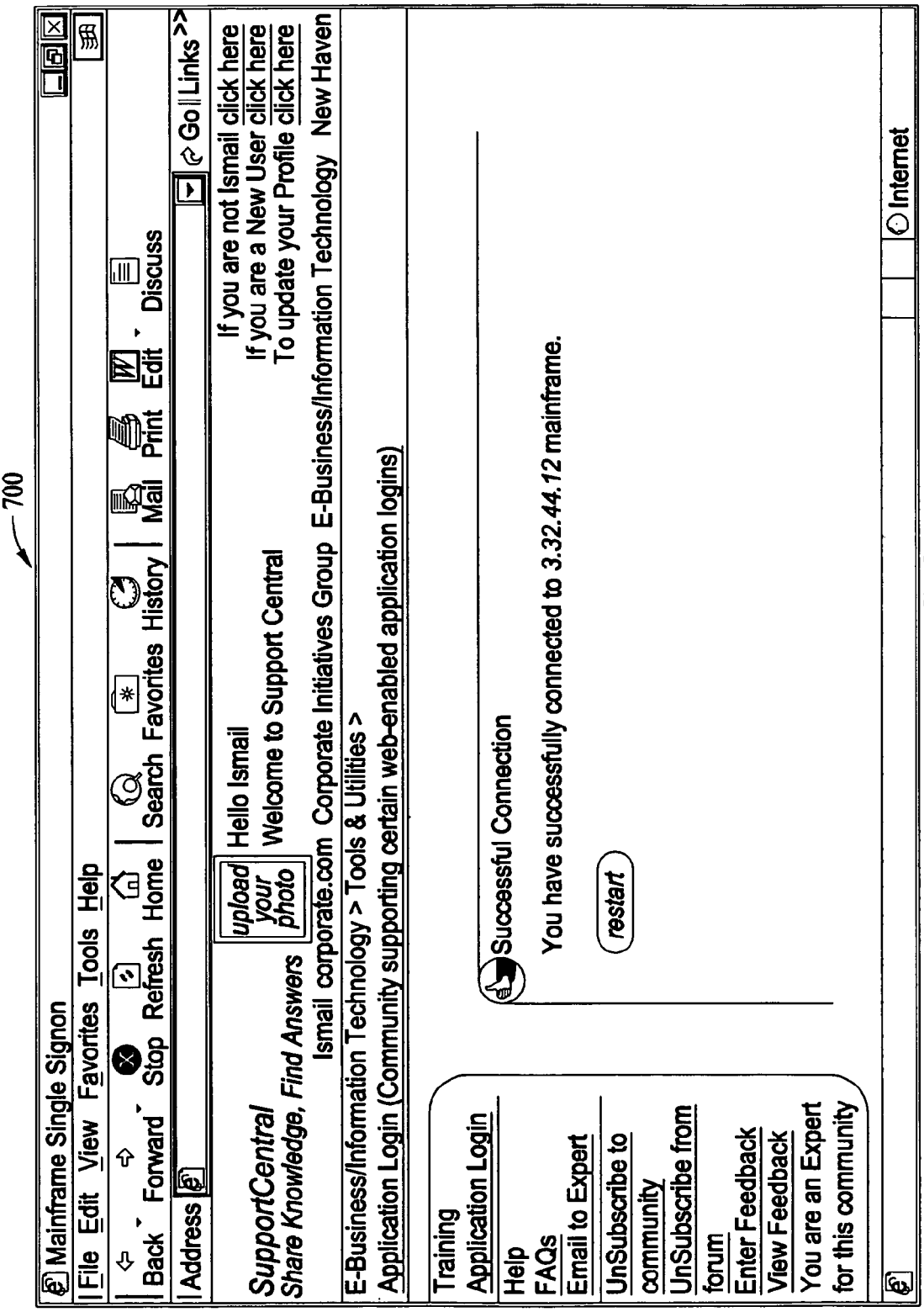
FIG. 8 is an example embodiment of a user interface included within a SSOS that displays a successful connection page.

FIG. 8 is an example embodiment of a user interface 700 displaying a successful connection page included within SSOS 10 (shown in FIG. 1). User interface 700 is displayed after the API code communicates the user ID and the new randomly generated password to the selected computer system. The user is then securely logged into the selected computer system.

Figure 9:
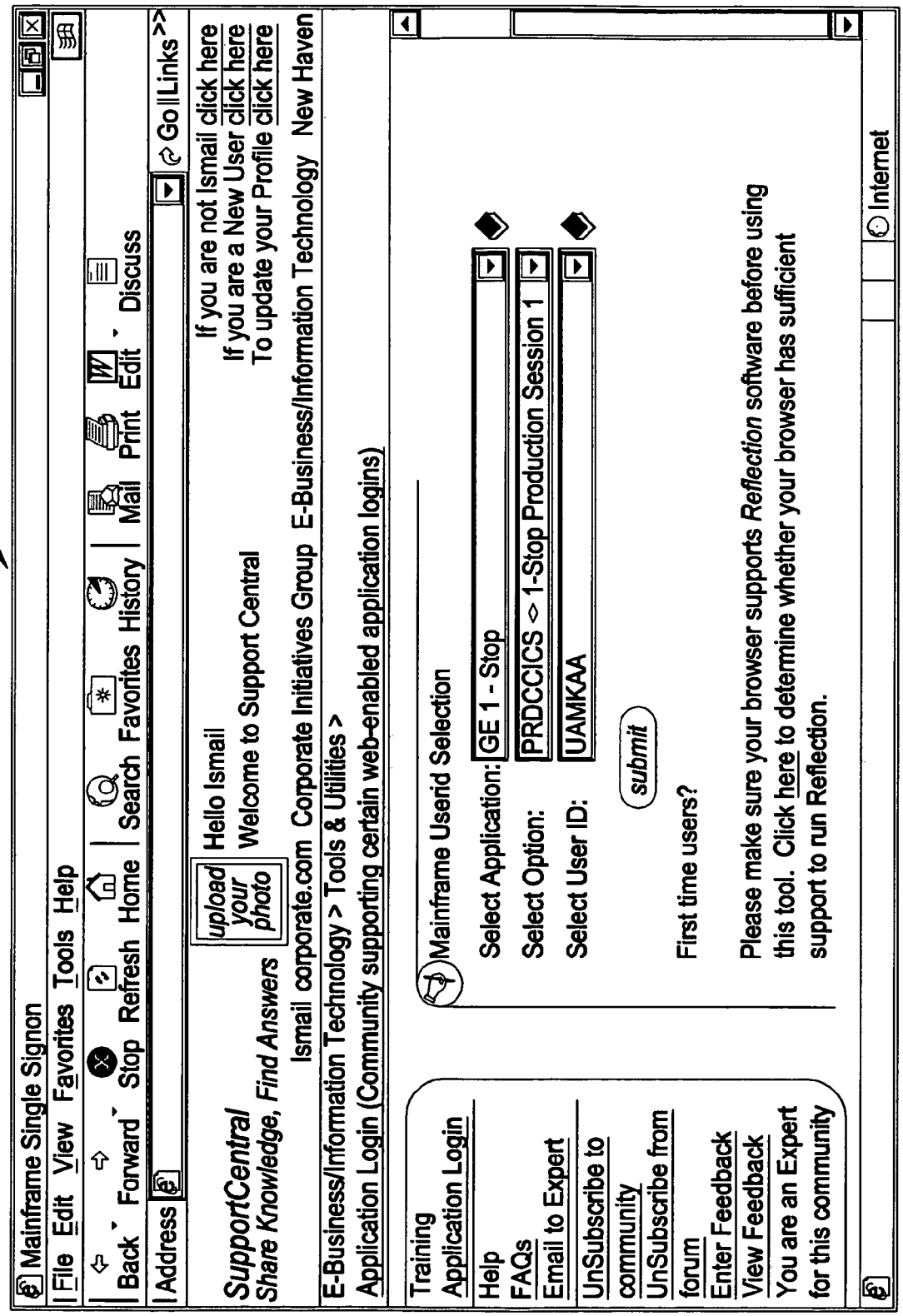
FIG. 9 is an example embodiment of a user interface included within a SSOS that displays a mainframe user ID selection page.

FIG. 9 is an example embodiment of a user interface 750 displaying a mainframe user ID selection page included within a SSOS 10 (shown in FIG. 1). User interface 750 is an alternative embodiment of user interface 600 (shown in FIG. 6). User interface 750 includes a Select Application pull-down field, a Select Option pull-down field, a Select User ID pull-down field, and a Submit button. User interface 750 enables a user to access an application within a selected computer system.

Figure 10:
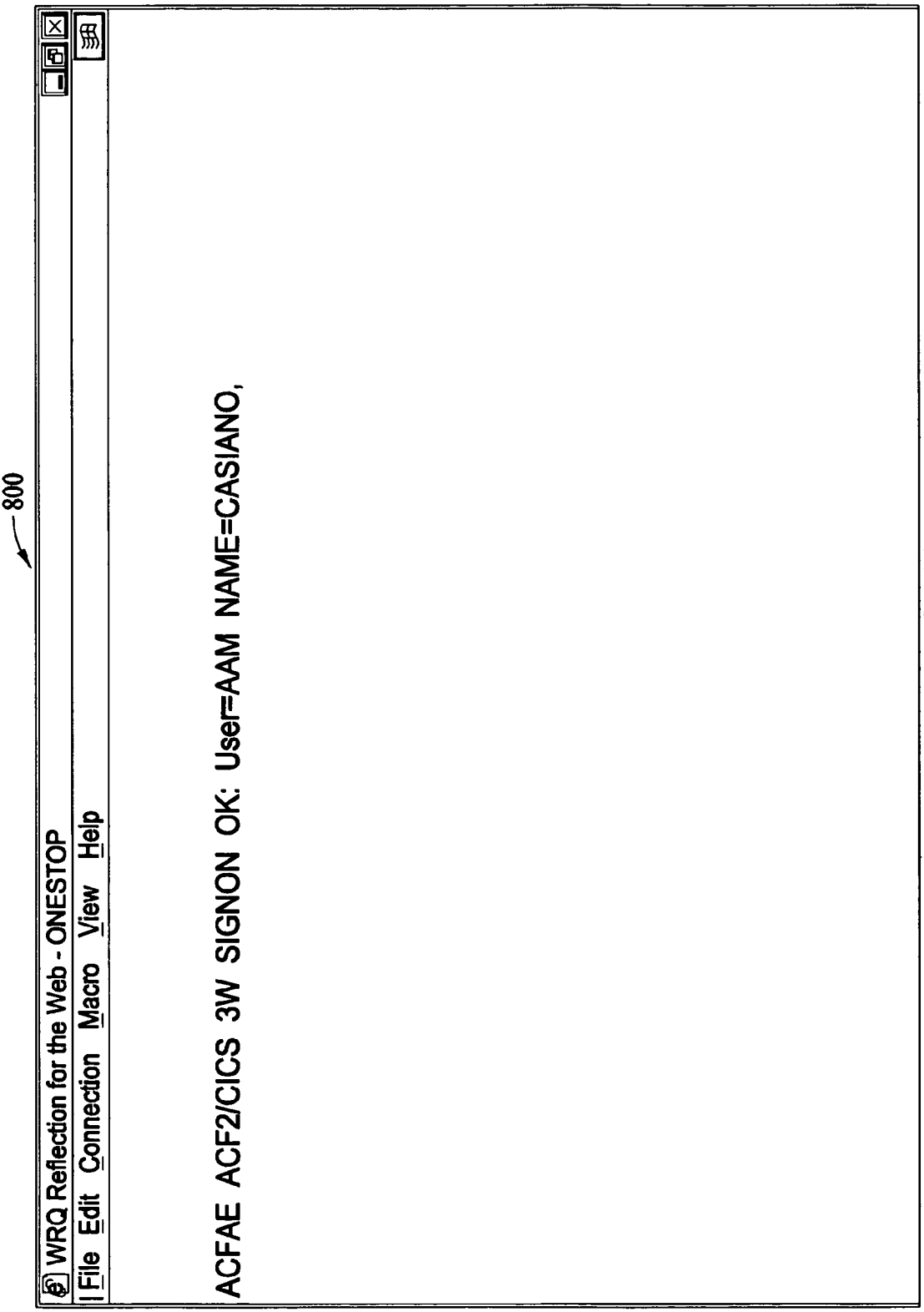
FIG. 10 is an example embodiment of a user interface included within a SSOS that displays an opened connection to a selected computer system page.

FIG. 10 is an example embodiment of a user interface 800 displaying an opened connection to a selected computer system page. User interface 800 is displayed after SSOS 10 (shown in FIG. 1) opens a user session to a legacy computer system using an Application Programming Interface (API) and a Telnet emulator. In the example embodiment, user interface 800 is displayed using a WRQ Reflections® Web Emulator.

SSOS 10 therefore facilitates an increase in security for accessing legacy computer system because users do not know their own legacy passwords and such passwords are not stored anywhere. The SSOS also provides improved user convenience because the user only has to remember one set of IDs and passwords to access a plurality of legacy computer systems. Furthermore, the SSOS provides a seamless login for users that are already logged into the SSOS such that the users are not prompted to login Ids and passwords for each legacy computer system. Consequently, the SSOS eliminates the need for users to be required to remember numerous passwords and user IDs for each legacy computer system. Moreover, the user will no longer have to contact a computer help desk or a technology department within the business so that the user's user ID and/or password may be retrieved so that the user can access the computer system. Rather, the SSOS provides a secure solution that authenticates the user using a standard employee ID and password, and then sets a new random password that conforms to the proper format each time a user logs into a legacy computer system using a password reset utility.

While the invention has been described in terms of various specific embodiments, those skilled in the art will recognize that the invention can be practiced with modification within the spirit and scope of the claims.

What is claimed is:

1. A method for accessing a network-based computer system including a server system coupled to a centralized database and at least one client system, said method comprising the steps of:

entering at a client system a single sign on identification (SSO ID) and a single sign on password (SSO password) assigned to a user;

receiving at the server system the user's SSO ID and SSO password;

authenticating the SSO ID and SSO password by transmitting the SSO ID and SSO password to the database;

displaying on the client system, after authenticating the entered SSO ID and SSO password, each computer system that the user is permissioned to access and each user identification (user ID) permissioned to access each corresponding computer system displayed on the client system;

selecting a computer system to be accessed by the user along with a permissioned user ID;

randomly generating a user password for accessing the selected computer system in direct response to the user selecting the computer system;

automatically capturing the randomly generated user password within a password reset application, the password reset application configured to perform a password reset operation on the selected computer system;

automatically triggering the password reset operation upon capturing the randomly generated user password within the password reset application, the password reset operation defines a reset password for the selected computer system as the randomly generated user password, wherein a new randomly generated user password is generated and a new password reset operation is performed each time the user at least one of accesses the selected computer system and accesses any other computer system the user is permissioned to access;

transmitting the selected user ID and the randomly generated user password from the server system to the selected computer system without storing the randomly generated user password in the database; and accessing the selected computer system by the user using the selected ID and the randomly generated user password.

2. A method according to claim 1 wherein authenticating the SSO ID and SSO password further comprises:

storing a list of SSO IDs with corresponding SSO passwords within the database;

transmitting at the server system the entered SSO ID and SSO password to a web page; and validating the entered SSO ID and SSO password by comparing the SSO ID and SSO password included within the web page to the list of SSO IDs stored within the database.

3. A method according to claim 1 wherein displaying on the client system after authenticating the entered SSO ID and SSO password further comprises:

generating a query at the server system based on the authenticated SSO ID and SSO password;

transmitting the query from the server system to the database; and processing the query at the database to generate a list of all user IDs associated with the authenticated SSO ID and SSO password.

4. A method according to claim 3 wherein processing the query at the database further comprises processing the query at the database to generate a list of all user IDs associated with the authenticated SSO ID and SSO password, each user ID is associated with a computer system that the user is permissioned to access.

5. A method according to claim 1 wherein selecting a computer system to be accessed further comprises selecting a user ID associated with the computer system to be accessed.

6. A method according to claim 5 wherein randomly generating a user password further comprises:

randomly generating a user password satisfying a predetermined password format for the selected computer system; and communicating to the selected computer system from the server system the selected user ID and the randomly generated user password.

7. A method according to claim 1 wherein transmitting the selected user ID and the randomly generated user password further comprises:

utilizing an application programming interface and an emulator to transmit the user ID and the randomly generated user password from the server system to the selected computer system; and opening a user session within the selected computer system based on the transmitted user ID and user password.

8. A method according to claim 1 further comprising connecting the client system and the server system via a network that includes one of a local area network, a wide area network, an intranet, and the Internet.

9. A system for accessing a network based computer system, said system comprising:

a client system comprising a browser;

a centralized database for storing information; and a server system comprising a password reset application and configured to be coupled to said client system and said database, said server system further configured to:

receive from said client system a single sign on identification (SSO ID) and a single sign on password (SSO password) assigned to a user;

transmit the SSO ID and SSO password to said database for authentication purposes;

display on said client system each computer system that the user is permissioned to access based on the authenticated SSO ID and SSO password and each user identification (user ID) permissioned to access each corresponding computer system displayed on the client system;

prompt the user to select a computer system to be accessed along with a permissioned user ID;

randomly generate a user password for accessing the selected computer system in direct response to the user selecting the computer system;

automatically capture the randomly generated user password within the password reset application, the password reset application configured to perform a password reset operation on the selected computer system;

automatically trigger the password reset operation upon capturing the randomly generated user password within the password reset application, the password reset operation defines a reset password for the selected computer system as the randomly generated user password, wherein a new randomly generated user password is generated and a new password reset operation is performed each time the user at least one of accesses the selected computer system and accesses any other computer system the user is permissioned to access;

transmit the selected user ID and the randomly generated user password to the selected computer system without storing the randomly generated user password in said database; and access the selected computer system by the user using the selected ID and the randomly generated user password.

10. A system according to claim 9 wherein said server system is further configured to:

store a list of SSO IDs with corresponding SSO passwords within the database;

transmit the entered SSO ID and SSO password to a web page; and validate the entered SSO ID and SSO password by comparing the SSO ID and SSO password included within the web page to the list of SSO IDs stored within the database.

11. A system according to claim 9 wherein said server system is further configured to:

generate a query based on the authenticated SSO ID and SSO password;

transmit the query to the database; and process the query at the database to generate a list of all user IDs associated with the authenticated SSO ID and SSO password.

12. A system according to claim 11 wherein each user ID included within the list of user IDs is associated with a computer system that the user is permissioned to access.

13. A system according to claim 9 wherein said server system is further configured to prompt the user to select a computer system to be accessed by displaying on said client system a user ID associated with the computer system to be accessed.

14. A system according to claim 13 wherein said server system is further configured to:
randomly generate a user password satisfying a predetermined password format for the selected computer system; and
transmit to the selected computer system the selected user ID and the randomly generated user password.

15. A system according to claim 9 wherein said server system is further configured to:
utilize an application programming interface and an emulator to transmit the user ID and the randomly generated user password to the selected computer system; and
opening a user session within the selected computer system based on the transmitted user ID and user password.

16. A system according to claim 9 wherein said client system and said server system are coupled via a network that includes one of a local area network, a wide area network, an intranet, and the Internet.

17. A computer program embodied on a computer readable medium for accessing a network-based computer system, said program comprising a code segment that receives a single sign on identification (SSO ID) and a single sign on password (SSO password) assigned to a user and then:
authenticates the SSO ID and SSO password;
displays on a client system each computer system that the user is permissioned to access and each user identification (user ID) permissioned to access each corresponding computer system displayed on the client system;
prompts the user to select a computer system to be accessed along with a permissioned user ID;
randomly generates a user password for accessing the selected computer system in direct response to the user selecting the computer system;
automatically captures the randomly generated user password within a password reset application, the password reset application configured to perform a password reset operation on the selected computer system;
automatically triggers the password reset operation upon capturing the randomly generated user password within the password reset application, the password reset operation defines a reset password for the selected computer system as the randomly generated user password, wherein a new randomly generated user password is generated and a new password reset operation is performed each time the user at least one of accesses the selected computer system and accesses any other computer system the user is permissioned to access; and
transmits a user identification (user ID) the selected user ID and the randomly generated user password, without storing the randomly generated user password in a database, to the selected computer system such that the selected computer system is accessed by the user using the selected ID and the randomly generated user password.

18. A computer program according to claim 17 further comprising a code segment that:
stores a list of SSO IDs with corresponding SSO passwords within the database;
communicates the entered SSO ID and SSO password to a web page; and
validates the entered SSO ID and SSO password by comparing the SSO ID and SSO password included within the web page to the list of SSO IDs stored within the database.

19. A computer program according to claim 17 further comprising a code segment that:
generates a query based on the authenticated SSO ID and SSO password;
transmits the query to the database; and
processes the query at the database to generate a list of all user IDs associated with the authenticated SSO ID and SSO password.

20. A computer program according to claim 17 further comprising a code segment that:
randomly generates a user password satisfying a predetermined password format for the selected computer system; and
transmits to the selected computer system a selected user ID and the randomly generated user password.

21. A computer program according to claim 17 further comprising a code segment that:
accesses an application programming interface and an emulator to transmit the user ID and the randomly generated user password to the selected computer system; and
opens a user session within the selected computer system based on the transmitted user ID and user password.

22. A method according to claim 1 wherein randomly generating a user password at the server system for accessing the selected computer system comprises randomly generating a first user password at the server system, transmitting the first user password from the server system to the selected computer system without storing the first user password in the database, and using the first user password to access the selected computer system.

23. A method according to claim 1 wherein transmitting a user ID and the randomly generated user password comprises transmitting a single password from the server system to the selected computer system.

24. A computer program according to claim 17 further comprising a code segment that:
captures the randomly generated user password in a variable; and
communicates the variable to a password application, wherein the password application executes a password reset operation for the selected computer system such that the new password is valid only for the selected computer system.

25. A method according to claim 1, wherein automatically triggering the password reset operation further comprises automatically triggering the password reset operation in direct response to the capturing of the randomly generated user password within the password reset application.

* * * * *